Patented Dec. 4, 1945

2,390,406

UNITED STATES PATENT OFFICE 2,390,406

ALKALINE COMPOSITION OF MATTER

Walter F. Wegst, Ralph McNabney, and Leslie R. Bacon, Wyandotte, Mich., assignors to Wyandotte Chemicals Corporation, Wyandotte, Mich., a corporation of Michigan No Drawing. Application July 17, 1943,
Serial No. 495,186

9 Claims. (Cl. 23—63)

This invention relates to dustless flake, granular or powdered alkaline compositions and their manufacture. While the invention is particularly applicable to caustic soda and caustic potash it likewise embraces other strongly alkaline materials such as trisodium phosphate, sodium carbonate, -orthosilicate, -sesquisilicate, -metasilicate and other alkaline-reacting carbonates and silicates.

This invention also relates to an alkaline composition of matter, such as a detergent composition.

Dustiness of inert materials is an objectionable condition. But with substances like caustic soda and caustic potash which are extremely irritating to the skin and respiratory tract, this vexation is multiplied.

In the preparation and handling of caustic alkalies even in flake or granular form, there are always, incidentally produced finely divided, particles which give rise to objectionable dust. With ground caustic there is an even greater percentage of fine particles present, and although by sifting or other mechanical expediencies, much of this can be removed, the caustic is not rendered free thereof. Then too, this operation is very generally impractical for other reasons.

It is often advantageous to produce caustic and other strongly alkaline solids in a granular or finely powdered state. In this form, these materials possess ready solubility in water and other liquids, as well as convenience of handling. They readily lend themselves to pouring, measuring or packaging. But the pronounced defects referred to supra militate against their commercial use. Limitations on the flexibility of compounding frequently arise, and mixtures of desirable overall chemical composition consequently cannot be made because of severe dusting conditions.

Attempts have been made to solve this dusting difficulty by the employment of humectant substances and hydrocarbon oils. One mode has been to wet the caustic down with kerosene or some other petroleum fraction. Such a mixture forms a loose, damp or wet appearing product. There are disadvantages attending this attack of the problem. Whereas this mixture can go into such trade channels as detergents for laundry and metal cleaning, it finds disfavor for example in detergents for the food industry and in lye packaged for household use. The taste and odor of kerosene is objectionable in foods which pick up such contamination very readily. Furthermore glassware and utensils washed with simple detergents of this nature tend to drain imperfectly and with poor water-break. For much the same reasons pine oil, terpenes and related compounds are open to objection. Representative humectant substances comprise ethylene glycol, glycerine and non-crystallizing sugar solutions. These fail to show fully satisfactory results when applied to the more alkaline compositions because of too great reactivity, resulting in caking, discoloration or loss of effectiveness.

The desired properties of an ideal dust laying liquid are: (1) Non-reactivity with the dusty composition; (2) Insolubility of the dusty composition in the added liquid; (3) Absence of effect or minimum effect on the solubility of the composition treated therewith in other liquids; (4) Very low volatility over a wide range of temperature; (5) Freedom from objectionable odors (or taste); (6) Non-toxicity; (7) Non-interference with the use-functions of the dust laying composition; (8) Conference of permanency in the dust laying effect.

We have found that by incorporating an aliphatic or cyclic liquid polyether with an inorganic highly alkaline solid material, said ether being free of hydroxy or carbonyl groups, a dustless composition results. The amount of additive can be varied. With as low as 0.5% by weight marked improvement results although some dusting is evident. With 1% addition dust control is excellent; the product is practically dry in character. At a content of 2% of such an ether the resulting product is damp in character, but loose and very easy to handle without skin or nasal irritation. Amounts such as 5–10% can be used for laying dust, where economically feasible, and more up to any limit where in a test sample there is liquid separation by drainage. The addition of an aliphatic or cyclic polyether to solid alkaline materials beyond this amount serves other purposes than settling the dust such as solvent and blending properties useful in the cleaning, dispersing and solubilizing action of alkaline compositions intended for detergent usage. Improvements in storage characteristics of many alkaline formulations can also be secured as well as wide control over the physical condition of the treated products.

Suitable aliphatic polyethers are diethylene glycol dimethyl ether formal and dimethoxy tetra glycol. The respective formulae are $$(CH_3OC_2H_4OC_2H_4O)_2CH_2$$

and $CH_3OC_2H_4OC_2H_4OC_2H_4OC_2H_4OCH_3$. And cyclic polyethers such as 1,4 dioxane and 1,3 dioxane are likewise suitable. Other long chain aliphatic polyethers, whether straight or branched chain or cyclic polyethers can be used. The higher molecular types, such as dimethoxy tetra glycol and diethylene glycol dimethyl ether formal possess in exceptional degree the eight attributes listed supra for an ideal dust laying liquid. It has been found generally necessary for use with caustic formulations that the compounds contain no free hydroxy, carbonyl or otherwise reactive groups. Compounds such as mono butyl ether of ethylene glycol $BuOC_2H_4OH$, mono acetate of ethylene glycol monoethyl ether $$CH_3COOC_2H_4OC_2H_5$$

methoxy triglycol acetate $$CH_3OC_2H_4OC_2H_4OC_2H_4OOCCH_3$$

fail immediately or after relatively short periods.

The following examples set forth a few of the various ways in which the principle of our invention may be utilized. Said examples are purely illustrative and are not to be construed as limitations on the invention.

*Example I*

To 100 g. of ground caustic soda, very dusty and irritating in character and of which a large fraction would pass a 100 mesh screen, were added the following amounts of dimethoxy tetraethylene glycol $CH_3OC_2H_4OC_2H_4OC_2H_4OCH_3$ with the results indicated:

| Weight of additive in grams | Observations |
|---|---|
| 2 | Not visibly dusty. Free flowing. |
| 4 | No dust. Damp. |
| 8 | Increasingly damp. Tendency to adhere to walls of container. |
| 14 | Very damp but not saturated. No drainage or separation of liquid under pressure. Approximate practicable limit of addition to avoid separation of liquid by drainage under commercial conditions. |
| 18 | Very wet. No immediate tendency to separate free liquid. |
| 22 | Saturated. |

No heat evolution, caking, or other evidences of chemical action or instability were observed in any case.

*Example II*

To 100 g. of ground flake caustic soda, from which material finer than approximately 20 mesh had been largely removed by screening but which remained dusty and irritating to the nose, were added the following amounts of dimethoxy tetraethylene glycol with the results indicated:

| Weight of additive in grams | Observations |
|---|---|
| 2 | No dust. No irritation to the nose. Damp. |
| 4 | Very damp. Tendency to adhere to walls of container. |
| 6 | Wet and sticky. |
| 8 | Approximate practicable limit of addition to avoid separation of liquid by drainage under commercial conditions. |
| 10 | Very wet. No immediate tendency to separate free liquid. |
| 12 | Excess liquid evident. |

*Example III*

Two grams of dimethoxy tetraethylene glycol per 100 g. of a dusty powdered commercial detergent consisting of sodium metasilicate, sodium carbonate, sodium tetraphosphate and an alkyl aryl sulfonate wetting agent effectively laid all dust, with no evidence of reaction, depreciation of storage or other qualities. Dimethoxy tetraethylene glycol was superior in efficiency and stability to methoxy triglycol acetate in parallel tests.

*Example IV*

A 600 g. mixture of dimethoxy tetraethylene glycol (2%) and an extremely dusty and hydroscopic formulation (98%) containing caustic soda as the principal constituent, zinc oxide and sodium pyrophosphate was prepared. Serial dilutions were made such that the dust laying agent constituted 2, 1, ½, ¼ and ⅛% of the mixtures respectively.

| Per cent of additive | Observations |
|---|---|
| ⅛ | Practically no effect on dustiness. |
| ¼ | Slightly dusty but much improved. |
| ½ | No dust. Dry and free flowing. |
| 1 | No dust. Very slightly moist. |
| 2 | Damp. Free, non-lumping. |

Samples containing 1 and 2% of dimethoxy tetraethylene glycol remained unchanged far in excess of 8 months at room temperatures.

Samples tested for storage over radiators where temperatures varied irregularly from 50 to 140° F. for 10 days showed that the untreated alkali mixture caked hard whereas increasing proportions of the additive liquid improved storage properties progressively so that the 2% dimethoxy tetraethylene glycol sample was merely knit to a soft plastic cake, easily broken loose by tapping to form a loose, lump-free, non-dusty product very similar to its original character.

Similar treated samples held at 104° F. for 10 days showed slight knitting but the materials became entirely loose and free flowing on gentle tapping, similar to the original preparations.

*Example V*

The same alkaline formulation used in Example IV was also used for testing ethylene glycol diethyl ether, $C_2H_5OCH_2CH_2OC_2H_5$. No heat or evidence of reaction was observed on additions up to 10%. Such a mixture remained wet and non-dusty for more than two months. 1% additions were sufficient to lay the dust, yielding a loose, dry free flowing powder. 2% ethylene glycol diethyl ether produced a slightly damp, non-dusty very satisfactory mix. Ethylene glycol diethyl ether is less satisfactory than dimethoxy tetra glycol because of high odor level, greater volatility and lesser permanence of dust laying effectiveness.

*Example VI*

The same alkaline formulation used in Example IV was used also for testing 1,4 dioxane, $O(C_2H_4)_2O$, a cyclic diether. Mixtures containing 10, 5, 3% dioxane held up satisfactorily for two weeks but a 1% mix again became dusty. Dioxane, while effective, is less efficient than the agents of Example I–V and for some purposes objectionable because of low flash point and toxicity.

*Example VII*

Diethylene glycol dimethyl ether formal $$(CH_3OC_2H_4OC_2H_4)_2CH_2$$

gave practically the same results as dimethoxy tetraethylene glycol (Example IV).

*Example VIII*

The same alkaline formulation of Example IV was used also for testing dichloro ethyl ether, $ClC_2H_4OC_2H_4Cl$. Dust laying and solubility tests at 2% additions were very satisfactory but this material has a strong ether-chloroform odor.

It will be understood that this invention in its broader aspect is applicable to various mixtures of which the strongly alkaline solids are components, and more particularly to compositions where there is a dusting tendency due to finely divided particles of the alkaline bodies.

Since many apparent and widely different embodiments of this invention may be made without departing from the spirit thereof, it is to be understood that we do not limit ourselves to the foregoing examples or description except as indicated in the following claims.

We claim:

1. A composition of matter comprising a solid alkaline compound from the group consisting of the alkaline-reacting alkali hydroxides, -phosphates, -carbonates and -silicates admixed with an amount of a member of the group consisting of dimethoxy tetraethylene glycol, diethylene glycol dimethyl ether and dioxane, said amount being not below 0.5% by weight but not above the quantity which would result in liquid separation by drainage.

2. A dustless composition comprising a solid highly inorganic alkaline compound admixed with an amount of a member of the group consisting of dimethoxy tetraethylene glycol, diethylene glycol dimethyl ether and dioxane not below about 0.5% by weight but not above the quantity which would result in liquid separation by drainage.

3. A dustless composition comprising caustic alkali admixed with a minor percentage of a member of the group consisting of dimethoxy tetraethylene glycol, diethylene glycol dimethyl ether and dioxane, the range being not below 0.5% by weight but not above the quantity whereby liquid would separate by drainage.

4. A dustless composition comprising caustic soda admixed with between about 0.5 and 5% by weight of a member of the group consisting of dimethoxy tetraethylene glycol, diethylene glycol dimethyl ether and dioxane.

5. A composition of matter comprising a solid alkaline compound from the group consisting of the alkaline-reacting alkali hydroxides, -phosphates, -carbonates and -silicates admixed with an amount of dimethoxy tetraethylene glycol not below about 0.5% by weight and not above the quantity whereby a liquid separation by drainage would result.

6. A dustless composition comprising ground caustic soda and 2 to 22% by weight of dimethoxy tetraethylene glycol.

7. A composition of matter comprising a solid alkaline compound from the group consisting of the alkaline-reacting alkali hydroxides, -phosphates, -carbonates and -silicates admixed with 0.5% to 2% by weight of dimethoxy tetraethylene glycol.

8. A composition of matter comprising a solid alkaline compound from the group consisting of the alkaline-reacting alkali hydroxides, -phosphates, -carbonates and -silicates admixed with 3 to 10% of 1,4 dioxane.

9. A composition of matter comprising a solid alkaline compound from the group consisting of the alkaline-reacting alkali hydroxides, -phosphates, -carbonates and -silicates admixed with 0.5 to 2% by weight of diethylene glycol dimethyl ether.

WALTER F. WEGST.
RALPH McNABNEY.
LESLIE R. BACON.